(12) United States Patent
Majonen

(10) Patent No.: US 7,848,469 B2
(45) Date of Patent: Dec. 7, 2010

(54) RECEIVER

(75) Inventor: Kari Tapio Majonen, Haukipudas (FI)

(73) Assignee: Nokia Corporation, Espoo (FI)

( * ) Notice: Subject to any disclaimer, the term of this patent is extended or adjusted under 35 U.S.C. 154(b) by 860 days.

(21) Appl. No.: 11/796,342

(22) Filed: Apr. 27, 2007

(65) Prior Publication Data

US 2008/0159451 A1 Jul. 3, 2008

(30) Foreign Application Priority Data

Dec. 29, 2006 (GB) .................................. 0626023.6

(51) Int. Cl.
*H03D 1/04* (2006.01)
(52) U.S. Cl. ..................... 375/346; 375/329; 375/148; 375/130; 375/134; 370/328; 370/441; 370/503; 455/522; 455/13.4; 455/226.3
(58) Field of Classification Search ................. 375/346, 375/329, 148, 130, 314; 370/328, 441, 503; 455/522, 13.4, 226.3
See application file for complete search history.

(56) References Cited

U.S. PATENT DOCUMENTS 7,397,842 B2* 7/2008 Bottomley et al. .......... 375/148
7,769,117 B2* 8/2010 Heikkila et al. ............. 375/346
2003/0081658 A1 5/2003 Messier et al. .............. 375/147
2004/0022207 A1 2/2004 Leung et al. ................ 370/321
2004/0240586 A1* 12/2004 Li et al. ...................... 375/329
2005/0069023 A1* 3/2005 Bottomley et al. .......... 375/148
2005/0281324 A1 12/2005 Wallen ....................... 375/148
2006/0116080 A1* 6/2006 Eom ............................ 455/62

FOREIGN PATENT DOCUMENTS

WO WO-2005/096517 A1 10/2005

* cited by examiner

*Primary Examiner*—Eva Y Puente
(74) *Attorney, Agent, or Firm*—Harrington & Smith

(57) ABSTRACT

A receiver for a telecommunication system, including a radio frequency unit connected to at least one antenna and configured to receive using a multitude of channels, and an estimator configured to estimate a first signal to interference and noise estimate dependent on a noise covariance matrix and channel vector, and estimate a second signal to interference and noise estimate dependent on the first signal to interference and noise estimate and a bias correction term.

27 Claims, 7 Drawing Sheets

RECEIVER

CROSS-REFERENCE TO RELATED APPLICATIONS

This patent application claims priority under 35 U.S.C. §119(a) from a UK Patent Application no. GB 0626023.6, filed Dec. 29, 2006, the disclosure of which is incorporated by reference herein in its entirety.

TECHNICAL FIELD

The teachings in accordance with the exemplary embodiments of this invention relate generally to a receiver and, more specifically, relate to a receiver for determining signal to noise ratios in a communication system.

BACKGROUND

A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

A communication system is a facility which facilitates the communication between two or more entities such as the communication devices, network entities and other nodes. A communication system may be provided by one more interconnect networks. One or more gateway nodes may be provided for interconnecting various networks of the system. For example, a gateway node is typically provided between an access network and other communication networks, for example a core network and/or a data network.

An appropriate access system allows the communication device to access to the wider communication system. An access to the wider communications system may be provided by means of a fixed line or wireless communication interface, or a combination of these. Communication systems providing wireless access typically enable at least some mobility for the users thereof. Examples of these include wireless communications systems where the access is provided by means of an arrangement of cellular access networks. Other examples of wireless access technologies include different wireless local area networks (WLANs) and satellite based communication systems.

A wireless access system typically operates in accordance with a wireless standard and/or with a set of specifications which set out what the various elements of the system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the networks and their functions and responsibilities are typically defined by a predefined communication protocol.

In the cellular systems a network entity in the form of a base station provides a node for communication with mobile devices in one or more cells or sectors. It is noted that in certain systems a base station is called 'Node B'. Typically the operation of a base station apparatus and other apparatus of an access system required for the communication is controlled by a particular control entity. The control entity is typically interconnected with other control entities of the particular communication network. Examples of cellular access systems include Universal Terrestrial Radio Access Networks (UTRAN) and GSM (Global System for Mobile) EDGE (Enhanced Data for GSM Evolution) Radio Access Networks (GERAN).

A non-limiting example of another type of access architectures is a concept known as the Evolved Universal Terrestrial Radio Access (E-UTRA). An Evolved Universal Terrestrial Radio Access Network (E-UTRAN) consists of E-UTRAN Node Bs (eNBs) which are configured to provide base station and control functionalities of the radio access network. The eNBs may provide E-UTRA features such as user plane radio link control/medium access control/physical layer protocol (RLC/MAC/PHY) and control plane radio resource control (RRC) protocol terminations towards the mobile devices.

In system providing packet switched connections the access networks are connected to a packet switched core network via appropriate gateways. For example, the eNBs are connected to a packet data core network via an E-UTRAN access gateway (aGW).

Control of the downlink of the E-UTRAN from the base station to the user equipment is carried out based on channel quality indicator (CQI) measured at the user equipment and transmitted to the base station (BS). These calculations are, in general, referred to as link adaptation. Based on this feedback and other factors (these other factors may include system load and delay sensitivity of transmissions) the base station can multiplex different users in time and frequency, and adjust modulation and coding parameters so that time and frequency resources are effectively utilized.

The CQI values are typically generated from Post-detection Signal to Interference and Noise Ratio (SINR) (or where interference is negligible or ignored Signal to Noise Ratio (SNR)) estimates.

In case of a single input multiple output (SIMO) interference rejection combining (IRC) receiver the calculation of post-detection SINR can be shown to be a calculation of symbol amplitude at the output of the antenna combiner unit.

However, these estimates are biased, which can become an issue where absolute values are required. The receiver may have one or several antennas. In the below examples we show two RX antennas. As is known from the IRC receiver the received signal after FFT at a certain subcarrier can be presented as (subcarrier index neglected)

$$r = \begin{pmatrix} r_1 \\ r_2 \end{pmatrix} = \begin{pmatrix} h_1 \\ h_2 \end{pmatrix} b + \begin{pmatrix} n_1 \\ n_2 \end{pmatrix} = hb + n,$$

where h is a channel vector (which is formed from the two channel estimates $h_1$, and $h_2$ from the transmitter to the first and second antenna), b is the unknown data symbol, and n is noise vector.

The IRC receiver has an antenna combiner having coefficients $$w = \begin{pmatrix} w_1 \\ w_2 \end{pmatrix} = C_{nn}^{-1} \hat{h},$$

where $C_{nn}^{-1}$ is inverse spatial noise covariance matrix of the subcarrier in question and $\hat{h}$ is estimate of channel vector h.

IRC antenna combiner output (the combination of the combiner and the received signal) is then given by $$z = w^H r = w_1^* r_1 + w_2^* r_2$$
$$= \underbrace{w^H h}_{A} b + \underbrace{w^H n}_{e} = Ab + e$$

The SINR in this situation is defined as the $$SINR = \frac{|A|^2}{Var(e)}$$
$$= \frac{|w^H h|^2}{E(|w^H n|^2)}$$
$$= \frac{|w^H h|^2}{w^H C_{nn} w}$$
$$\stackrel{w = C_{nn}^{-1} h}{=} \frac{|w^H h|^2}{w^H C_{nn} C_{nn}^{-1} h}$$
$$= \frac{|w^H h|^2}{|w^H h|}$$
$$= w^H h.$$

These formula and equations however do not account for errors in estimating the values. As such they include these errors which bias the estimation of the signal to noise ratios.

SUMMARY

In an exemplary aspect of the invention, there is provided a receiver for a telecommunication system, comprising: a radio frequency unit connected to at least one antenna and configured to receive using a multitude of channels, and an estimator configured to estimate a first signal to interference and noise estimate dependent on a noise covariance matrix and channel vector, and estimate a second signal to interference and noise estimate dependent on the first signal to interference and noise estimate and a bias correction term.

In another exemplary aspect of the invention, there is provided a receiver of a telecommunication system, comprising means for receiving signals using a multitude of channels, and means for estimating a first signal to interference and noise estimate dependent on the noise covariance matrix and channel vector, and means for estimating a second signal to interference and noise estimate dependent on the first signal to interference and noise estimate and a bias correction term.

In another exemplary aspect of the invention, there is provided a method for estimating signal to interference and noise of a received signal, comprising receiving a signal from at least one antenna, the signal received via at least one channel, estimating a first signal to interference and noise estimate dependent on a noise covariance matrix and a channel vector; and estimating a second signal to interference and noise estimate dependent on the first signal to interference and noise estimate and a bias correction term.

In another exemplary aspect of the invention, there is provided a computer program product configured to perform a method for estimating signal to interference and noise of a received signal, comprising receiving a signal from at least one antenna, the signal received via at least one channel, estimating a first signal to interference and noise estimate dependent on a noise covariance matrix and a channel vector, and estimating a second signal to interference and noise estimate dependent on the first signal to interference and noise estimate and a bias correction term.

In yet another exemplary aspect of the invention, there is a circuit which includes a receiver to receive a signal from at least one antenna, the signal received via at least one channel; and an estimator to estimate a first signal to interference and noise estimate dependent on a noise covariance matrix and a channel vector, and a second signal to interference and noise estimate dependent on the first signal to interference and noise estimate and a bias correction term.

BRIEF DESCRIPTION OF THE DRAWINGS

For a better understanding of the present invention and how the same may be carried into effect, reference will now be made by way of example only to the accompanying drawings in which.

DETAILED DESCRIPTION

In the following certain specific embodiments are explained with reference to standards such as Global System for Mobile (GSM) Phase 2, Code Division Multiple Access (CDMA) Universal Mobile Telecommunication System (UMTS) and long-term evolution (LTE). The standards may or not belong to a concept known as the system architecture evolution (SAE) architecture, the overall architecture thereof being shown in FIG. 1.

Figure 1:
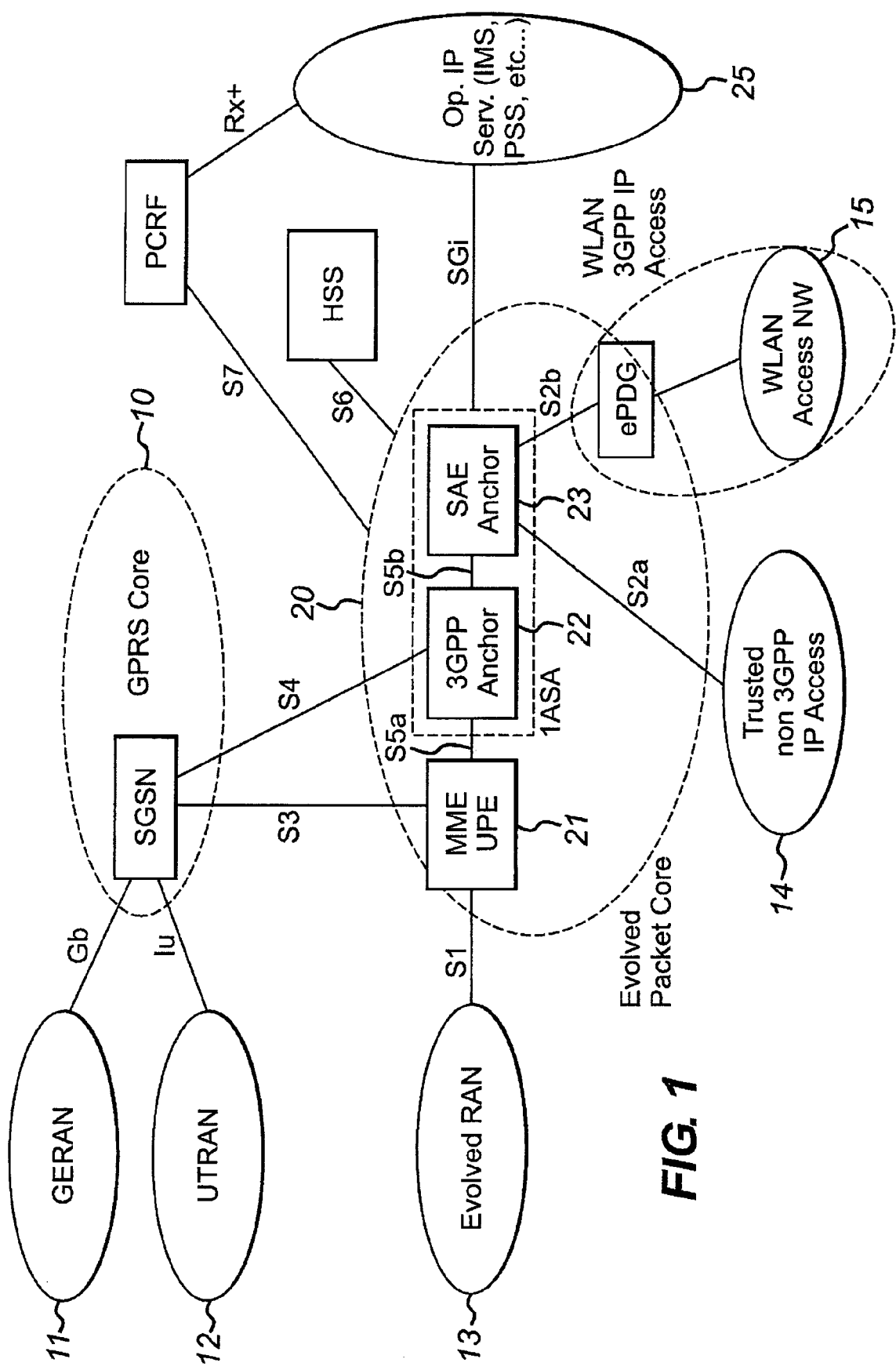
FIG. 1 shows a schematic presentation of a communication architecture wherein the invention may be embodied.

More particularly, FIG. 1 shows an example of how second generation (2G) access networks, third generation (3G) access networks and future access networks, referred to herein as long-term evolution (LTE) access networks are attached to a single data anchor (3GPP anchor). The anchor is used to anchor user data from 3GPP and non-3GPP networks. This enables adaptation of the herein described mechanism not only for all 3GPP network access but as well for non-3GPP networks.

In FIG. 1 two different types of radio access networks 11 and 12 are connected to a general packet radio service (GPRS) core network 10. The access network 11 is provided by a GERAN system and the access network 12 is provided by a UMTS terrestrial radio access (UTRAN) system. The core network 10 is further connected to a packet data system 20.

An evolved radio access system 13 is also shown to be connected to the packet data system 20. Access system 13 may be provided, for example, based on architecture that is known from the E-UTRA and base on use of the E-UTRAN Node Bs (eNodeBs or eNBs).

Access system 11, 12 and 13 may be connected to a mobile management entity 21 of the packet data system 20. These systems may also be connected to a 3GPP anchor node 22 which connects them further to a SAE anchor 23.

FIG. 1 shows further two access systems, that is a trusted non-3Gpp IP (internet protocol) access system 14 and a WLAN access system 15. These are connected directly to the SAE anchor 23.

In FIG. 1 the service providers are connected to a service provider network system 25 connected to the anchor node system. The services may be provided in various manners, for example based on IP multimedia subsystem and so forth. These do not form a part of the invention, and therefore are not explained in any detail other than that different service applications may set different requirements for the connection provided to the user devices.

Figure 2:
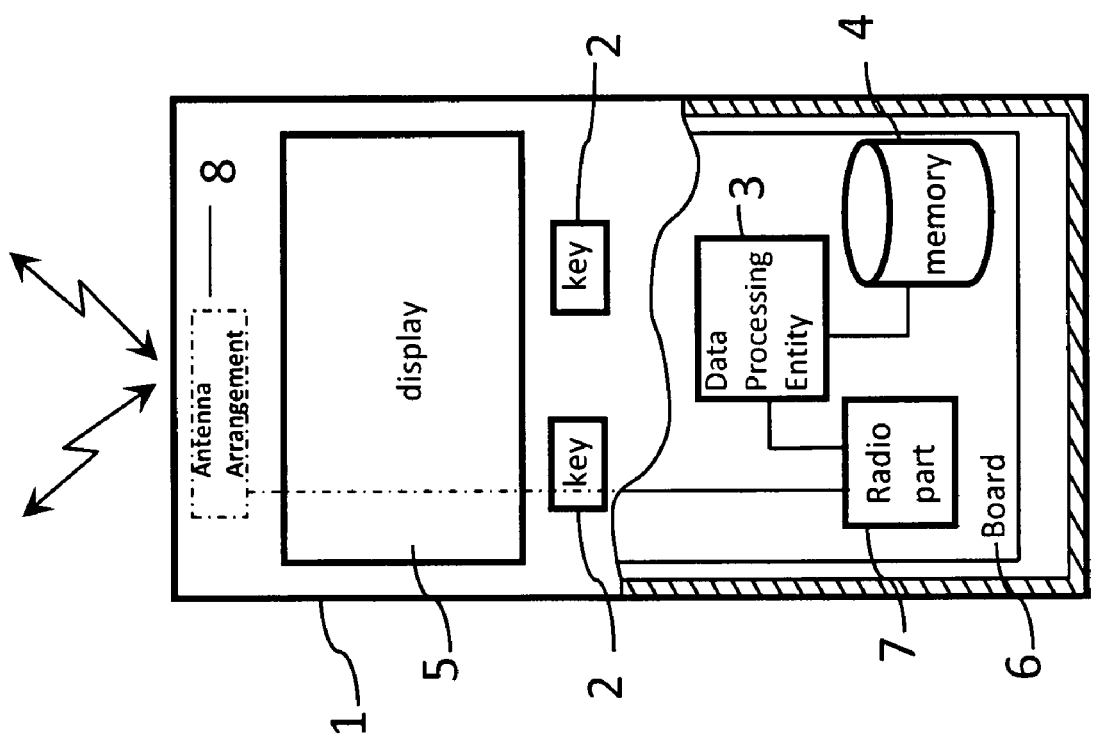
FIG. 2 shows a partially sectioned view of a mobile device.

FIG. 2 shows a schematic partially sectioned view of a possible user device, and more particularly of a mobile device 1 that can be used for accessing a communication system via a wireless interface provided via at least one of the access systems of FIG. 1. The mobile device of FIG. 2 can be used for various tasks such as making and receiving phone calls, for receiving and sending data from and to a data network and for experiencing, for example, multimedia or other content. An appropriate mobile device may be provided by any device capable of at least sending or receiving radio signals. Non-limiting examples include a mobile station (MS), a portable computer provided with a wireless interface card or other wireless interface facility, personal data assistant (PDA) provided with wireless communication capabilities, or any combinations of these or the like. The mobile device may communicate via an appropriate radio interface arrangement of the mobile device. The interface arrangement may be provided for example by means of a radio part 7 and associated antenna arrangement 8. The antenna arrangement 8 may be arranged internally or externally to the mobile device.

A mobile device is typically provided with at least one data processing entity 3 and at least one memory 4 for use in tasks it is designed to perform. The data processing and storage entities can be provided on an appropriate circuit board and/or in chipsets. This feature is denoted by reference 6.

The user may control the operation of the mobile device by means of a suitable user interface such as key pad 2, voice commands, touch sensitive screen or pad, combinations thereof or the like. A display 5, a speaker and a microphone are also typically provided. Furthermore, a mobile device may comprise appropriate connectors (either wired or wireless) to other devices and/or for connecting external accessories, for example hands-free equipment, thereto.

The mobile device 1 may be enabled to communicate with a number of access nodes, for example when it is located in the coverage areas of the two access system stations 11 and 12 of FIG. 1. This capability is illustrated in FIG. 2 by the two wireless interfaces.

Figure 3:
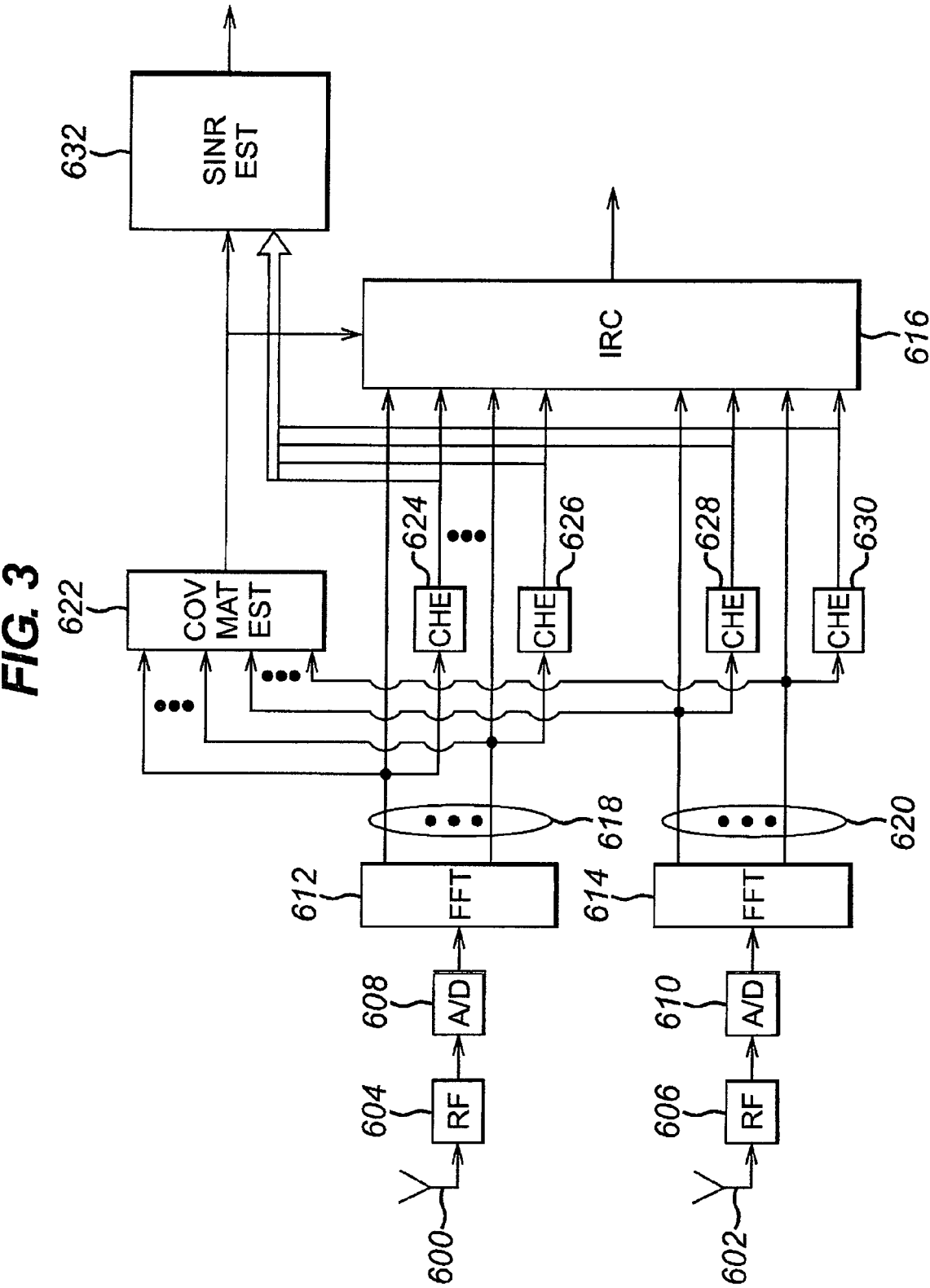
FIG. 3 shows a schematic view of a IRC receiver incorporating an embodiment of the present invention.

FIG. 3 illustrates the procedure of Interference Rejection Combining in an OFDMA receiver such as may be implemented in the mobile device of FIG. 2. The receiver of FIG. 3 comprises two antennas 600, 602. In other embodiments of the invention, the number of antennas may be greater. The antennas receive a signal transmitted by one or more transmitters.

The received signal is applied to radio frequency units 604, 606, which filter and amplify the signal and convert it to base band frequency. The output signals of the radio frequency units are applied to converters 608, 610, which convert the signals into digital form.

The signals are further applied to transformers 612, 614, where a Fast Fourier Transform (FFT) is performed on the signals. The signals are converted into frequency domain. The number of signals in the output of the transformers equals the number of used sub-carriers.

The signal 618 in the output of the first transformer 612 for the ith sub-carrier may be written in the form:

$$r_{i,1} = h_{i,1} b_i + n_{i,1}$$

and the signal 620 for the ith sub-carrier in the output of the second transformer 614 may be written in the form:

$$r_{i,2} = h_{i,2} b_i + n_{i,2}$$

where h represents the channel model, b is the received symbol and n represents noise and interference. The total signal for a sub-carrier i in vector form may be written as (sub-carrier index neglected):

$$r = hb + n.$$

The output signals 618, 620 of the transformers 612, 614 are applied to interference rejection combiner 616 which performs interference rejection as described in further detail below.

The signals from the output of the transformers are first multiplied in multipliers within the IRC 616 with IRC weight factors w, $$w = C_{nn}^{-1} h,$$

where $C_{nn}$ is a noise covariance matrix (for certain sub-carrier, index neglected), which in the case of two antennas is a 2×2 matrix:

$$C_{nn} = \begin{pmatrix} \sigma_1^2 & W[n_1 n_2^*] \\ E[n_2 n_1^*] & \sigma_2^2 \end{pmatrix},$$

where $\sigma_1^2 = E[n_1 n_1^*]$, $\sigma_2^2 = E[n_2 n_2^*]$, * denotes a complex conjugate and E[ ] represents the expected value. In the case of a receiver with one antenna, the noise covariance matrix $C_{nn}$ is a 1×1 matrix comprising the element $\sigma_1^2$.

The output signals 618, 620 of the transformers are further applied to covariance matrix calculator 622, which is configured to determine covariance matrices for each subcarrier.

In an embodiment of the invention, the covariance matrix $C_{nn}$ is calculated using a differential method by subtracting the signals of two or more nearby sub-carriers from each other after removing the effect of data modulation, which may be different in different sub-carriers. Subtracting cancels data from the signals and only noise terms remain. The following formula illustrates the calculation of the covariance matrix $C_{nn,i}$ for sub-carrier i:

$$C_{nn,i} = \frac{1}{2N} \sum_{j \in \{J\}} a_j \left( r_j \left( \frac{b_j}{b_{j+M_j}} \right) r_{j+M_j} \right) \left( r_j - \left( \frac{b_j}{b_{j+M_j}} \right) r_{j+M_j} \right)^H,$$

where $r_j$ and $r_{j+M_j}$ are received signals for two nearby sub-carriers j and j+$M_j$, J is the set of used sub-carriers, $b_j$ and $b_{j+M_j}$ are data symbols of the sub-carriers, $a_j$ is a carrier pair specific coefficient, and N is the number of sub-carrier pairs used in the calculation. $M_j$ is the distance of the sub-carriers. When the distance $M_j=1$, the sub-carriers are adjacent. The above equation is merely an example of the calculation of the covariance matrix.

The term $r_j$ may also be multiplied by $$\left(\frac{b_{j+M}}{b_j}\right),$$

for example, in which case term $r_{j+M_j}$ does not need any multiplier. It is also possible that sub-carriers in each sub-carrier pair are received in different time instants i.e. they may belong to different OFDM symbol intervals. The main requirement for the sub-carriers in each sub-carrier pair is that the channel is sufficiently constant between the two signal samples. If this requirement is met, the applied signal samples may differ either in frequency or time, or both.

The output signals of the transformers are further applied to calculators 624 to 630 which determine channel estimates for sub-carriers. The calculated matrices and channel estimates are taken to interference rejection combiner 616.

The receiver of FIG. 3 further comprises a SINR estimator with bias removal 632 which receives the channel estimated values from the channel estimators 624, 626, 628, and 630, the output of the covariance matrix estimator 622, and the biased SINR estimate.

In some embodiments of the invention the biased SINR estimate is calculated within the SINR estimator with bias removal entity 632.

The biased SINR estimate can be found as known in the art by applying the following steps.

Firstly signals transmitted by one or more transmitters using a multitude of subcarriers are received with one or more antennas.

Secondly, one or more subcarrier pairs are selected. Each subcarrier of each subcarrier pair is a given distance $M_j$ from each other. In this case, the distance of the subcarriers from each other $M_j$ is 1 in both pairs. The first pair comprises subcarriers j1 and j1+1. The second pair comprises subcarriers j2 and j2+1.

Thirdly, symbol estimates $b_{j1}$, $b_{j1+2}$, $b_{j2}$, and $b_{j2+1}$ for the signals of the subcarriers of the subcarrier pairs are determined. In an embodiment of the invention, such subcarriers are selected which comprise pilot symbols. The receiver knows the values of the pilot symbols. If pilot symbols are not available, estimates for the data symbols are determined by utilizing decision feedback algorithms, for example. In an embodiment, those subcarriers comprising pilot symbols that are nearest the desired subcarrier are selected as the subcarriers of the subcarrier pairs.

Fourthly, the effect of data modulation is removed from the signals of the subcarriers of the subcarrier pairs. For example, if $r_{j1+1}$ is to be subtracted from $r_{j1}$, the signal of $r_{j1+1}$ is multiplied by $b_{j1}/b_{j1+1}$.

Fifthly, noise estimates are obtained by subtracting the signals of the subcarriers of the subcarrier pairs from each other. In this case the signal of $r_{j1+1}$ is subtracted from the signal of $r_{j1}$ and the signal of $r_{j2+1}$ is subtracted from the signal of $r_{j2}$.

Figure 4:
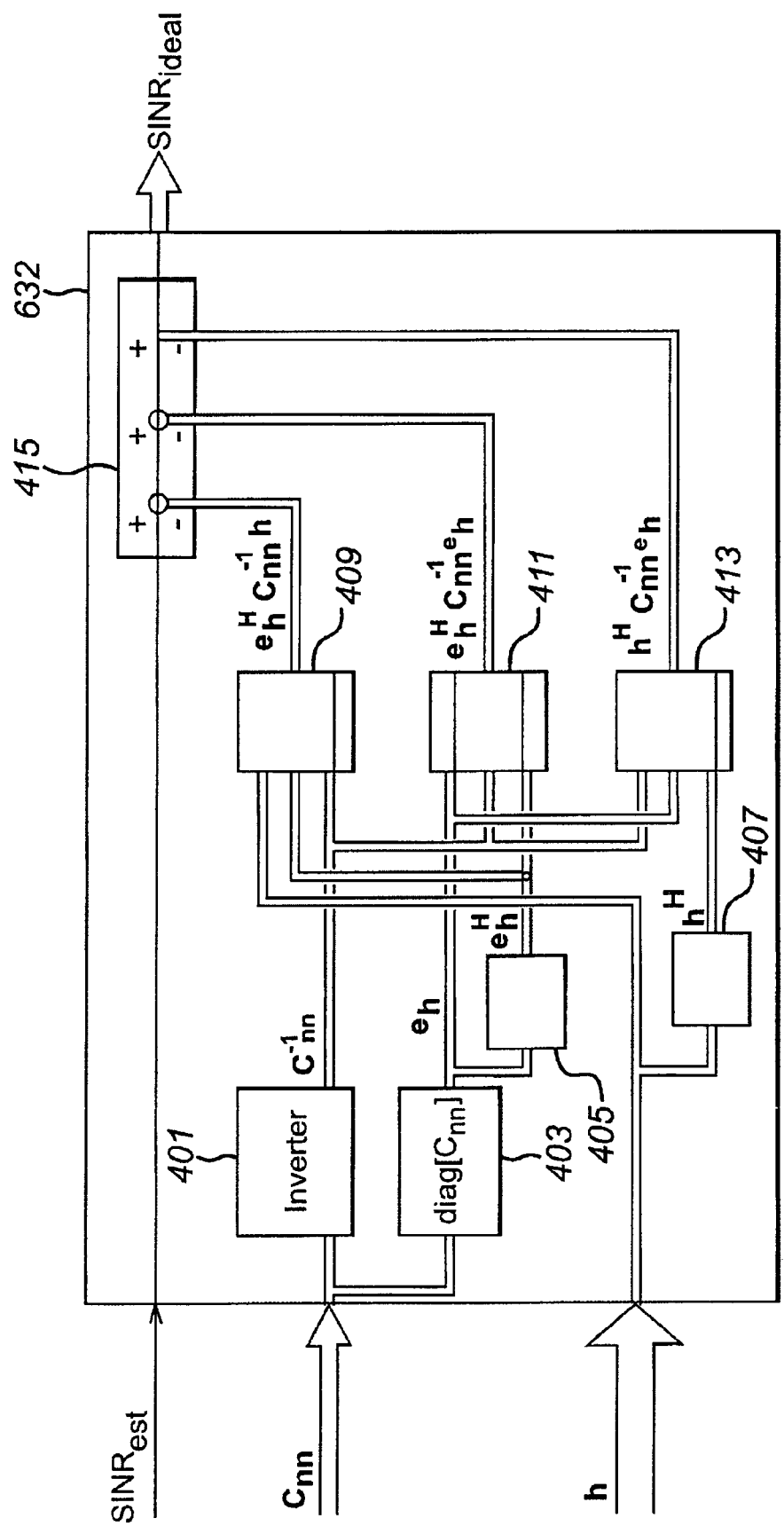
FIG. 4 show a schematic view of an embodiment of the present invention.

A first implementation of the SINR estimator with bias removal 632 is shown in further detail in FIG. 4.

The SINR estimator with bias removal 632 receives the channel estimations and combines them to produce the channel vector h. The channel vector h is transformed by entity 407 to produce the complex conjugate $h^H$ of channel vector.

The SINR estimator with bias removal 632 furthermore receives the estimated covariance matrix $C_{nn}$. The inverter 401 receives the estimated covariance matrix and outputs the inverted estimated covariance matrix $C_{nn}^{-1}$. The channel bias noise estimator 403 performs a diagonalization of the estimated covariance matrix to output an error vector $e_h$=diag$[C_{nn}]$.

Furthermore the error vector is complex conjugated in entity 405 to produce the complex conjugate of the error vector $e_h^H$.

The entity 409 receives the inputs $e_h^H$, $C_{nn}^{-1}$, and h to output a first noise bias error term $e_h^H C_{nn}^{-1} h$.

The entity 411 receives the inputs $e_h^H$, $C_{nn}^{-1}$, and $e_h$ to output a second noise bias error term $e_h^H C_{nn}^{-1} e_h$.

The entity 413 receives the inputs $h^H$, $C_{nn}^{-1}$, and $e_h$ to output a third noise bias error term $h^H C_{nn}^{-1} h$.

The entity 415 receives as inputs the estimated signal to noise value, and the first, second and third noise bias error terms. The entity 415 subtracts the first, second, and third noise bias error terms from the estimated signal to noise value in order to produce an estimate of the unbiased Signal to Interference plus Noise Ratio.

The unbiasing of the SINR or SNR estimation using the device described above can be explained mathematically by taking the formula presented earlier for SINR estimation. This formula when applied results in a biased estimate, as channel estimation errors will produce a SNR value different from the correct or ideal SINR. Considering the IRC receiver for Single Input Multiple Output (SIMO) with ideal channel and covariance estimates (that are both unbiased) the ideal SINR value may be determined as:

$$\text{SINR}_{IDEAL} = w^H h = h^H C_{nn}^{-1} h$$

Using the differential method for covariance estimation there is no dependence between channel estimation error and covariance estimate. Any error term in the channel estimate may be accounted for by inserting a channel estimation error $e_h$ term into the above ideal equation $$\begin{aligned} SINR_{EST} &= \hat{h}^H \hat{C}_{nn}^{-1} \hat{h} \\ &= (h^H + e_h^H)\hat{C}_{nn}^{-1}(h + e_h) \\ &= h^H \hat{C}_{nn}^{-1} h + h^H \hat{C}_{nn}^{-1} e_b + e_h^H \hat{C}_{nn}^{-1} h + e_h^H \hat{C}_{nn}^{-1} e_h \end{aligned}$$

The estimated SINR is related to the ideal SINR value as the first term of the estimated value is equal to the ideal estimate (since there is no bias term due to channel estimation error in covariance estimate if we use differential method).

In embodiments of the present invention it is therefore possible to restore the value of the ideal SINR estimation from the measured and calculated $SIR_{EST}$ value removing the three bias error values $h^H \hat{C}_{nn}^{-1} e_h + e_h^H \hat{C}_{nn}^{-1} h + e_h^H \hat{C}_{nn}^{-1} e_h$ from the estimated SINR values by using a subtractor entity 491 as shown in FIG. 4.

The choice of the error vector $e_h$ may be determined as shown in the embodiment of the unbiased estimator shown in FIG. 4, from the diagonal of the covariance matrix (that we have already estimated for IRC using differential method). The diagonal of the estimated covariance matrix is the noise plus interference variance seen at the receive antennas, but here it is independent of the channel estimation and does not require any knowledge on how the channel estimation is done, or estimate for the original noise variance.

Figure 5:
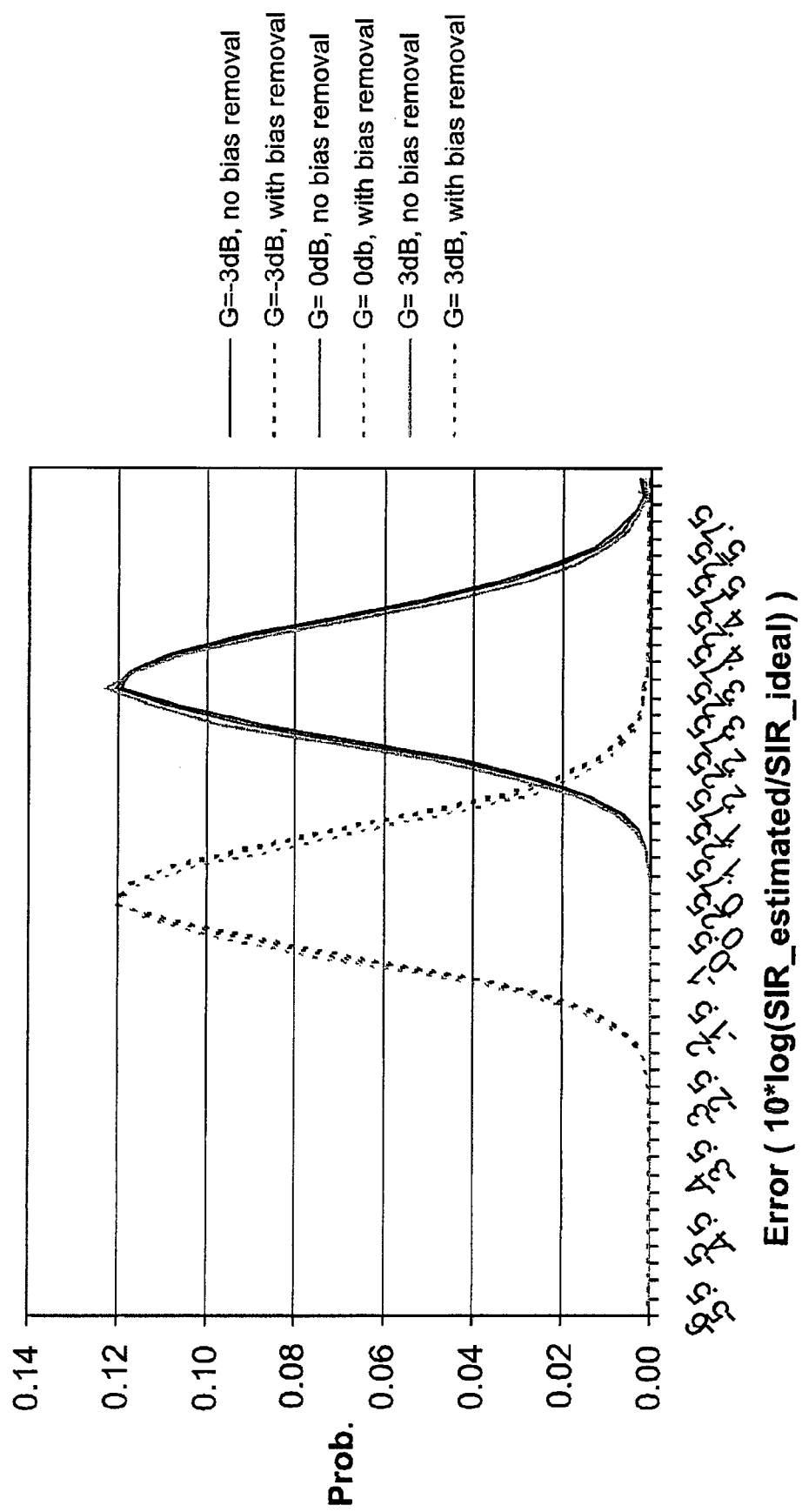
FIGS. 5 and 6 show graphs of simulations showing the improvements to Signal to Interference plus Noise Estimation following application of embodiments of the invention.
Figure 6:
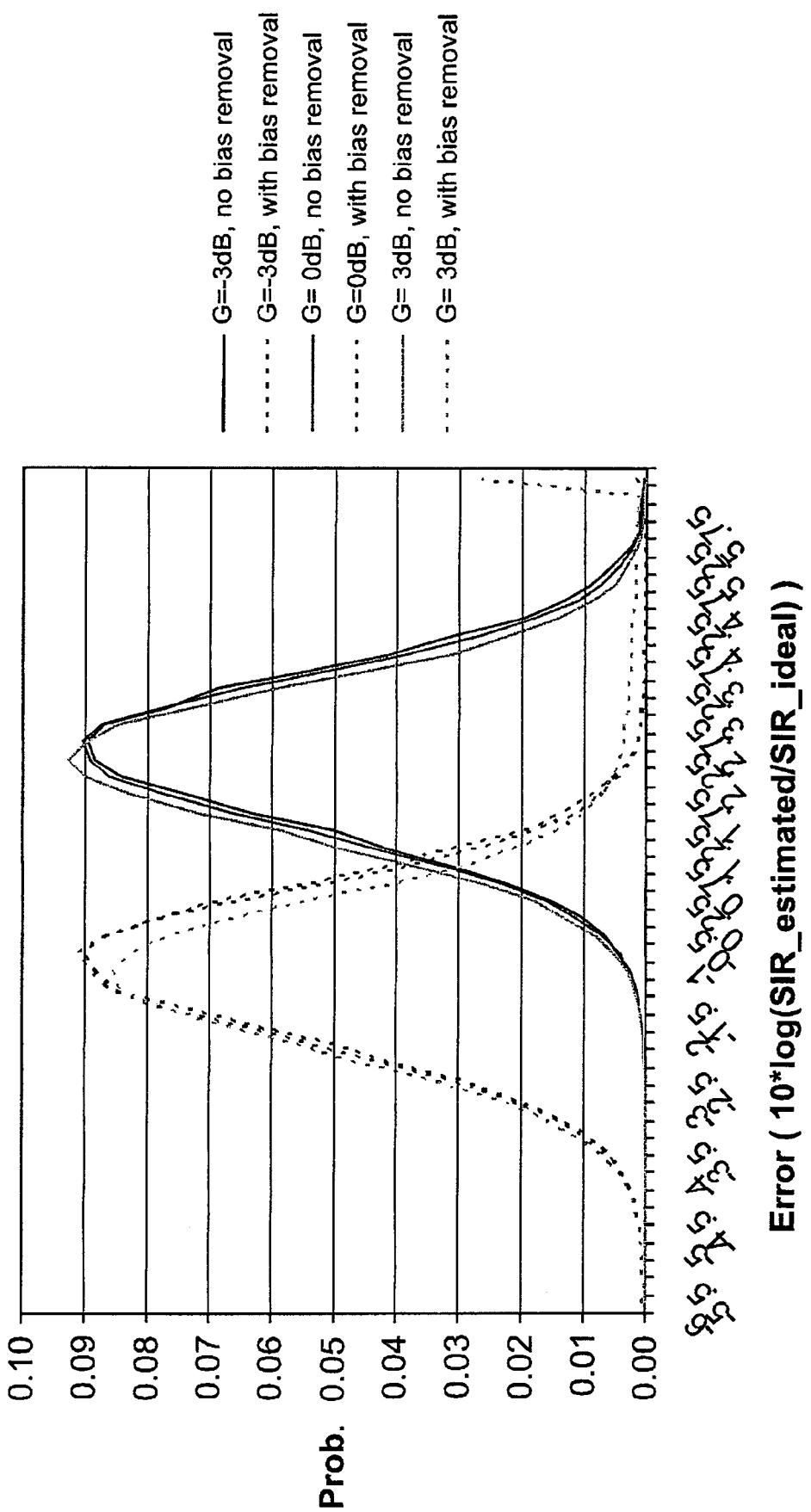

Two examples of the results of the subtraction of the noise error bias values from the estimated SINR can be seen in FIGS. 5 and 6.

FIG. 5, shows the effect of the removal of the noise error bias values from the estimated SINR where the noise levels are Gaussian in nature in a simulated IRC receiver environment. In these graphs the removal of the error bias terms clearly reduce the error term of SINR_estimated/SINR_ideal towards the ideal of 0 (dB).

FIG. 6, shows the effect of the removal of the noise error bias values from the estimated SINR where the noise levels are dominated by a single interferer in a simulated IRC receiver environment. In these graphs the removal of the error bias terms also clearly reduce the error term of SINR_estimated/SINR_ideal.

In an exemplary embodiment, the invention may provide signal to noise (or signal to noise plus interference) estimates with a lower level of bias within the bias estimation In an exemplary embodiment of the invention, the estimator may be configured to determine an estimate of the noise covariance matrix for a desired channel, and an estimate of a desired channel vector.

In an exemplary embodiment of the invention, the bias correction term may comprise a first term comprising the matrix combination of a complex conjugate of the estimated channel vector, an inverse of the estimated covariance matrix, and an error vector.

In an exemplary embodiment of the invention, the bias correction term may comprise a second term comprising the matrix combination of a complex conjugate of the error vector, the inverse of the estimated covariance matrix, and the estimated channel vector.

In an exemplary embodiment of the invention, the bias correction term may comprise a third term comprising the matrix combination of a complex conjugate of the error vector, the inverse of the estimated covariance matrix, and the error vector.

In an exemplary embodiment of the invention, the error vector is preferably the diagonal of the estimated covariance matrix.

In an exemplary embodiment of the invention, the second signal to interference and noise estimate is preferably the first signal to interference and noise estimate minus the bias correction term.

In an exemplary embodiment of the invention, the receiver may further comprise one or more antennas, and the estimator may further be configured to select one or more channel pairs, each channel of each channel pair being at a given distance from each other, determine symbol estimates for the signals of the channels of the channel pairs, remove an effect of data modulation from the signals of the channels of the channel pairs, obtain noise estimates by subtracting the signals of the channels of the channel pairs from each other, and determine the estimate of the noise covariance matrix for a desired channel based on the obtained noise estimates.

In an exemplary embodiment of the invention, the channel pair may comprise a first channel and a second channel, and the estimator is preferably further configured to divide the symbol estimate of the signal of the first channel by the symbol estimate of the signal of the second channel and subtract the signal of the second channel multiplied by the quotient from the signal of the first channel.

In an exemplary embodiment of the invention, the receiver is preferably configured to receive OFDMA transmission where the channels are sub-carriers of the OFDMA transmission. In another exemplary embodiment of the invention, the receiver is preferably configured to receive TDMA transmission where the channels are time slots of the TDMA transmission. Further, in an exemplary embodiment of the invention the receiver may be incorporated in user equipment, in a base station, or in a communications system.

It is noted that whilst embodiments have been described in relation to devices comprising mobile devices such as mobile terminals, embodiments of the present invention are applicable to any other suitable type of apparatus suitable for communication via access systems. Thus the above may be applied to the measurement of SINR in the base station or any entity in a wireless access network capable of receiving signals. A mobile device may be configured to enable use of different access technologies, for example, based on an appropriate multi-radio implementation.

Figure 7:
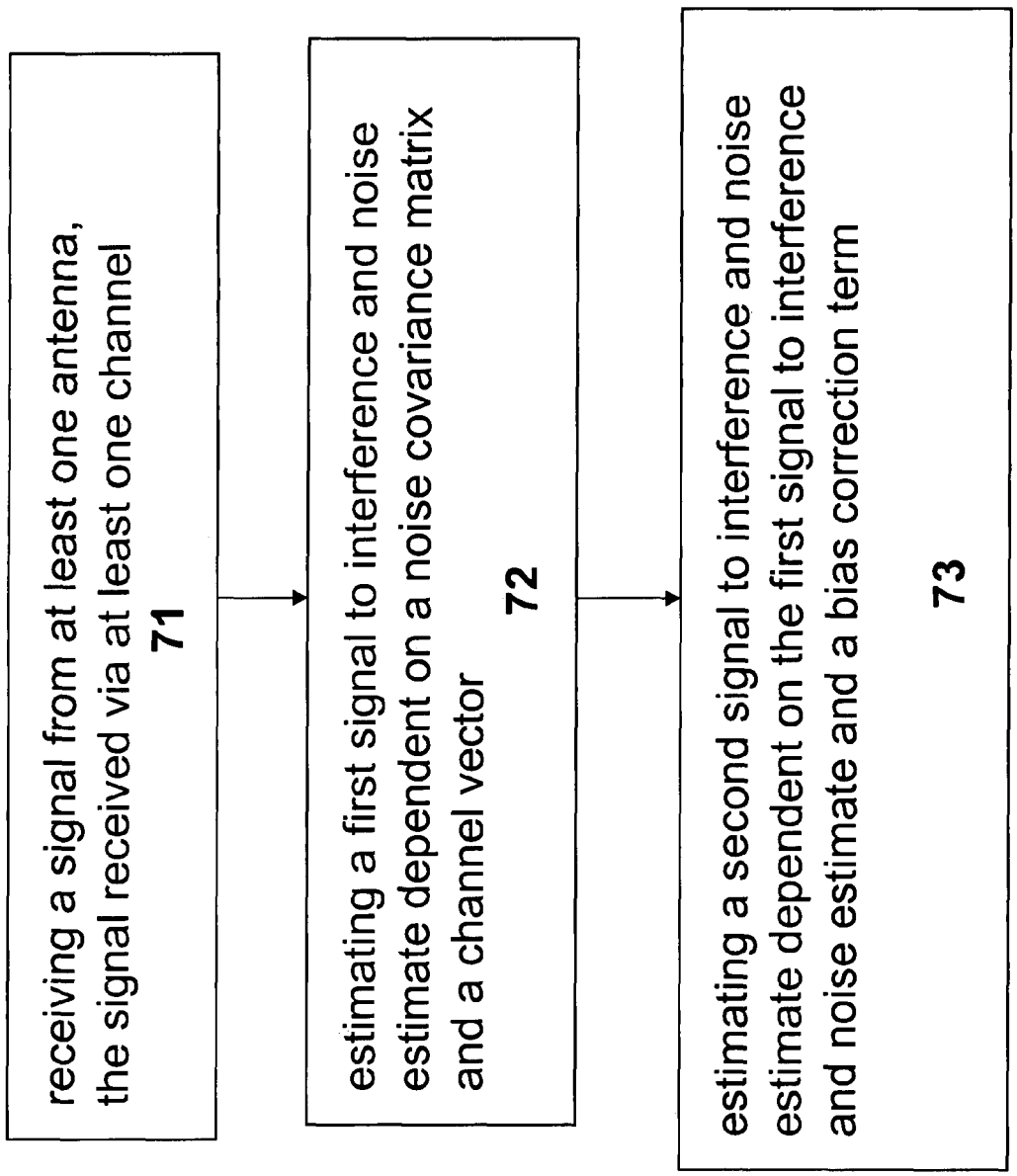
FIG. 7 illustrates a method as described in an exemplary embodiment of the invention.

Further, in FIG. 7 there is illustrated an exemplary embodiment of the invention. In FIG. 7 there is a method for estimating signal to interference and noise of a received signal, comprising the method steps of receiving a signal from at least one antenna, where the signal is received via at least one channel (Block 71), and further comprising, estimating a first signal to interference and noise estimate dependent on a noise covariance matrix and a channel vector (Block 72), and estimating a second signal to interference and noise estimate dependent on the first signal to interference and noise estimate and a bias correction term (Block 73).

In an exemplary embodiment of the invention, the method may also include estimating the noise covariance matrix for a desired channel, and estimating a desired channel vector. In another exemplary embodiment of the invention, the method includes generating a first bias correction term comprising the matrix combination of a complex conjugate of the estimated channel vector, an inverse of the estimated covariance matrix, and an error vector.

In an exemplary embodiment of the invention, the method may comprise generating a second bias correction term comprising the matrix combination of a complex conjugate of the error vector, the inverse of the estimated covariance matrix, and the estimated channel vector. Further, in another exemplary embodiment of the invention the method may comprise generating a third bias correction term comprising the matrix combination of a complex conjugate of the error vector, the inverse of the estimated covariance matrix, and the error vector.

In an exemplary embodiment of the invention, the error vector is preferably the diagonal of the estimated covariance matrix. In another exemplary embodiment of the invention, the second signal to interference and noise estimate is preferably the first signal to interference and noise estimate minus the bias correction term.

In an exemplary embodiment of the invention, the method may include selecting one or more channel pairs, each channel of each channel pair being at a given distance from each other, determining symbol estimates for the signals of the channels of the channel pairs, removing an effect of data modulation from the signals of the channels of the channel pairs, obtaining noise estimates by subtracting the signals of the channels of the channel pairs from each other, and determining the estimate of the noise covariance matrix for a desired channel based on the obtained noise estimates.

Whereas, in another exemplary embodiment of the invention the channel pair may comprise a first channel and a second channel, the method may comprise, dividing the symbol estimate of the signal of the first channel by the symbol estimate of the signal of the second channel, and subtracting the signal of the second channel multiplied by the quotient from the signal of the first channel.

Furthermore, in an exemplary embodiment of the invention the method may comprise receiving an OFDMA transmission where the channels are subcarriers of the OFDMA transmission. In yet another exemplary embodiment of the invention the method may include receiving TDMA transmission where the channels are time slots of the TDMA transmission.

It is also noted that although certain embodiments were described above by way of example with reference to the exemplifying architectures of certain mobile networks and a wireless local area network, embodiments may be applied to any other suitable forms of communication systems than those illustrated and described herein. It is also noted that the term access system is understood to refer to any access system configured for enabling wireless communication for user accessing applications.

The above described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a location server.

It is also noted herein that while the above describes exemplifying embodiments of the invention, there are several variations and modifications which may be made to the disclosed solution without departing from the scope of the present invention.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the exemplary embodiments of this invention could be used to advantage without the corresponding use of other features. As such, the foregoing description should be considered as merely illustrative of the principles of the invention, and not in limitation thereof.

What is claimed is:

1. An apparatus, comprising:
   at least one processor; and
   at least one memory including computer program code, where the at least one memory and the computer program code are configured, with the at least one processor, to cause the apparatus to at least:
   receive, with at least one antenna, using a multitude of channels;
   estimate a first signal to interference and noise estimate dependent on a noise covariance matrix and channel vector; and
   estimate a second signal to interference and noise estimate dependent on the first signal to interference and noise estimate and a bias correction term, wherein the bias correction term comprises a first term comprising a matrix combination of a complex conjugate of an estimate of a desired channel vector, an inverse of an estimate of a noise covariance matrix for a desired channel, and an error vector.

2. The apparatus of claim 1, wherein the bias correction term comprises a second term comprising a matrix combination of: a complex conjugate of the error vector, an inverse of the estimated covariance matrix, and the estimated channel vector.

3. The apparatus of claim 2, wherein the bias correction term comprises a third term comprising a matrix combination of: the complex conjugate of the error vector, the inverse of the estimated covariance matrix, and the error vector.

4. The apparatus of claim 1, wherein the error vector is a diagonal of the estimated covariance matrix.

5. The apparatus of claim 1, wherein the second signal to interference and noise estimate is the first signal to interference and noise estimate minus the bias correction term.

6. An apparatus, comprising:
   at least one processor; and
   at least one memory including computer program code, where the at least one memory and the computer program code are configured, with the at least one processor, to cause the apparatus to at least:

receive, with one or more antennas, using a multitude of channels;

estimate a first signal to interference and noise estimate dependent on a noise covariance matrix and channel vector;

estimate a second signal to interference and noise estimate dependent on the first signal to interference and noise estimate and a bias correction term;

wherein the bias correction term comprises a first term comprising a matrix combination of: a complex conjugate of an estimate of a desired channel vector, an inverse of an estimate of a noise covariance matrix for a desired channel, and an error vector;

select one or more channel pairs, each channel of each channel pair being at a given distance from each other, determine symbol estimates for signals of the channels of the channel pairs, remove an effect of data modulation from the signals of the channels of the channel pairs, obtain noise estimates by subtracting the signals of the channels of the channel pairs from each other, and determine the estimate of the noise covariance matrix for a desired channel based on the obtained noise estimates.

7. The apparatus of claim 6, wherein the one or more channel pairs comprise a first channel and a second channel, and the apparatus is further caused to divide a symbol estimate of a signal of the first channel by the symbol estimate of the signal of a second channel and subtract the signal of the second channel multiplied by a quotient from the signal of the first channel.

8. The apparatus of claim 1, wherein the at least one processor and the at least one memory are configured to cause the apparatus to receive an orthogonal frequency division multiple access transmission where the channels are subcarriers of the orthogonal frequency division multiple access transmission.

9. The apparatus of claim 1, wherein the at least one processor and the at least one memory are configured to cause the apparatus to receive a time division multiple access transmission where the channels are time slots of the time division multiple access transmission.

10. The apparatus of claim 1 embodied in a user equipment.

11. The apparatus of claim 1 embodied in a base station.

12. The apparatus of claim 1 embodied in a communications system.

13. A receiver of a telecommunication system, comprising:

means for receiving signals using a multitude of channels;

means for estimating a first signal to interference and noise estimate dependent on a noise covariance matrix and a channel vector; and means for estimating a second signal to interference and noise estimate dependent on the first signal to interference and noise estimate and a bias correction term, wherein the bias correction term comprises a first term comprising a matrix combination of a complex conjugate of an estimate of a desired channel vector, an inverse of an estimate of a noise covariance matrix for a desired channel, and an error vector.

14. A method, comprising:

receiving a signal from at least one antenna, wherein the signal is received via at least one channel;

estimating a first signal to interference and noise estimate dependent on a noise covariance matrix and a channel vector; and estimating a second signal to interference and noise estimate dependent on the first signal to interference and noise estimate and a bias correction term, wherein the bias correction term comprises a first bias correction term comprising a matrix combination of a complex conjugate of an estimated desired channel vector, an inverse of an estimate of a noise covariance matrix for a desired channel, and an error vector.

15. The method of claim 14, comprising:

generating a second bias correction term comprising a matrix combination of a complex conjugate of the error vector, the inverse of the estimated covariance matrix, and the estimated channel vector.

16. The method of claim 15, comprising:

generating a third bias correction term comprising a matrix combination of a complex conjugate of the error vector, the inverse of the estimated covariance matrix, and the error vector.

17. The method of claim 14, wherein the error vector is a diagonal of the estimated covariance matrix.

18. The method of claim 14, wherein the second signal to interference and noise estimate is the first signal to interference and noise estimate minus the bias correction term.

19. The method of claim 14, further comprising:

selecting one or more channel pairs, each channel of each channel pair being at a given distance from each other;

determining symbol estimates for signals of the channels of the channel pairs;

removing an effect of data modulation from the signals of the channels of the channel pairs;

obtaining noise estimates by subtracting the signals of the channels of the channel pairs from each other; and determining an estimate of a noise covariance matrix for a desired channel based on the obtained noise estimates.

20. The method of claim 19, wherein the channel pair comprises a first channel and a second channel, the method comprising:

dividing the symbol estimate of the signal of the first channel by the symbol estimate of the signal of the second channel; and subtracting the signal of the second channel multiplied by a quotient from the signal of the first channel.

21. The method of claim 14, comprising:

receiving an orthogonal frequency division multiple access transmission where the channels are subcarriers of the orthogonal frequency division multiple access transmission.

22. The method of claims 14, comprising:

receiving time division multiple access transmission where the channels are time slots of the time division multiple access transmission.

23. A non-transitory computer readable medium encoded with a computer program, which, when executed by an apparatus including a processor, is configured to cause the apparatus to perform actions, comprising:

receiving a signal from at least one antenna, the signal received via at least one channel;

estimating a first signal to interference and noise estimate dependent on a noise covariance matrix and a channel vector; and estimating a second signal to interference and noise estimate dependent on the first signal to interference and noise estimate and a bias correction term, wherein the bias correction term comprises a first term comprising a matrix combination of a complex conjugate of an estimated desired channel vector, an inverse of an estimate of a noise covariance matrix for a desired channel, and an error vector.

24. A circuit comprising:

a receiver to receive a signal from at least one antenna, the signal received via at least one channel; and an estimator to estimate a first signal to interference and noise estimate dependent on a noise covariance matrix and a channel vector, and a second signal to interference and noise estimate dependent on the first signal to interference and noise estimate and a bias correction term, wherein the bias correction term comprises a first term comprising a matrix combination of: a complex conjugate of an estimate of a desired channel vector, an inverse of an estimate of a noise covariance matrix for a desired channel, and an error vector.

25. The circuit of claim 24, wherein the bias correction term comprises a second term comprising a matrix combination of: a complex conjugate of the error vector, an inverse of the estimated covariance matrix, and the estimated channel vector.

26. The circuit of claim 25, wherein the bias correction term comprises a third term comprising a matrix combination of: the complex conjugate of the error vector, the inverse of the estimated covariance matrix, and the error vector.

27. A circuit as in claim 24, embodied in at least one integrated circuit.

* * * * *